United States Patent [19]

Hörnig et al.

[11] 4,451,245
[45] May 29, 1984

[54] COUPLING CONNECTION FOR A FIBER REINFORCED SYNTHETIC RESIN PIPE

[75] Inventors: Rudolf Hörnig, Esslingen; Günter Wörner, Kernen, both of Fed. Rep. of Germany

[73] Assignee: Daimler-Benz Aktiengesellschaft, Stuttgart, Fed. Rep. of Germany

[21] Appl. No.: 237,974

[22] Filed: Feb. 25, 1981

[30] Foreign Application Priority Data

Mar. 1, 1980 [DE] Fed. Rep. of Germany ....... 3007896

[51] Int. Cl.³ ........................... B32B 5/12; F16C 1/02
[52] U.S. Cl. ..................................... 464/181; 464/183
[58] Field of Search ..................... 464/181, 183, 182; 138/130; 403/359

[56] References Cited

U.S. PATENT DOCUMENTS

| | | | |
|---|---|---|---|
| 2,380,952 | 8/1945 | Dewey | 464/183 X |
| 4,238,539 | 12/1980 | Yates et al. | 464/181 X |
| 4,238,540 | 12/1980 | Yates et al. | 464/181 X |
| 4,265,951 | 5/1981 | Yates et al. | 464/181 X |
| 4,279,275 | 7/1981 | Stanwood et al. | 464/181 X |

FOREIGN PATENT DOCUMENTS 627418  8/1947  United Kingdom .

*Primary Examiner*—Stuart S. Levy
*Assistant Examiner*—Daniel P. Stodola
*Attorney, Agent, or Firm*—Craig & Burns

[57] ABSTRACT

A coupling connection for a fiber reinforced synthetic resin pipe, especially for a driving or driven hollow shaft of a motor vehicle, wherein the fibrous synthetic resin pipe is non-rotatably connected with a coupling element arranged concentrically to the pipe. The coupling element includes peripheral teeth and is pressed onto the fiber reinforced synthetic resin pipe in such a way that the coupling element forms a shape-mating connection with the fiber reinforced synthetic resin pipe in a direction of rotation of the pipe.

21 Claims, 13 Drawing Figures

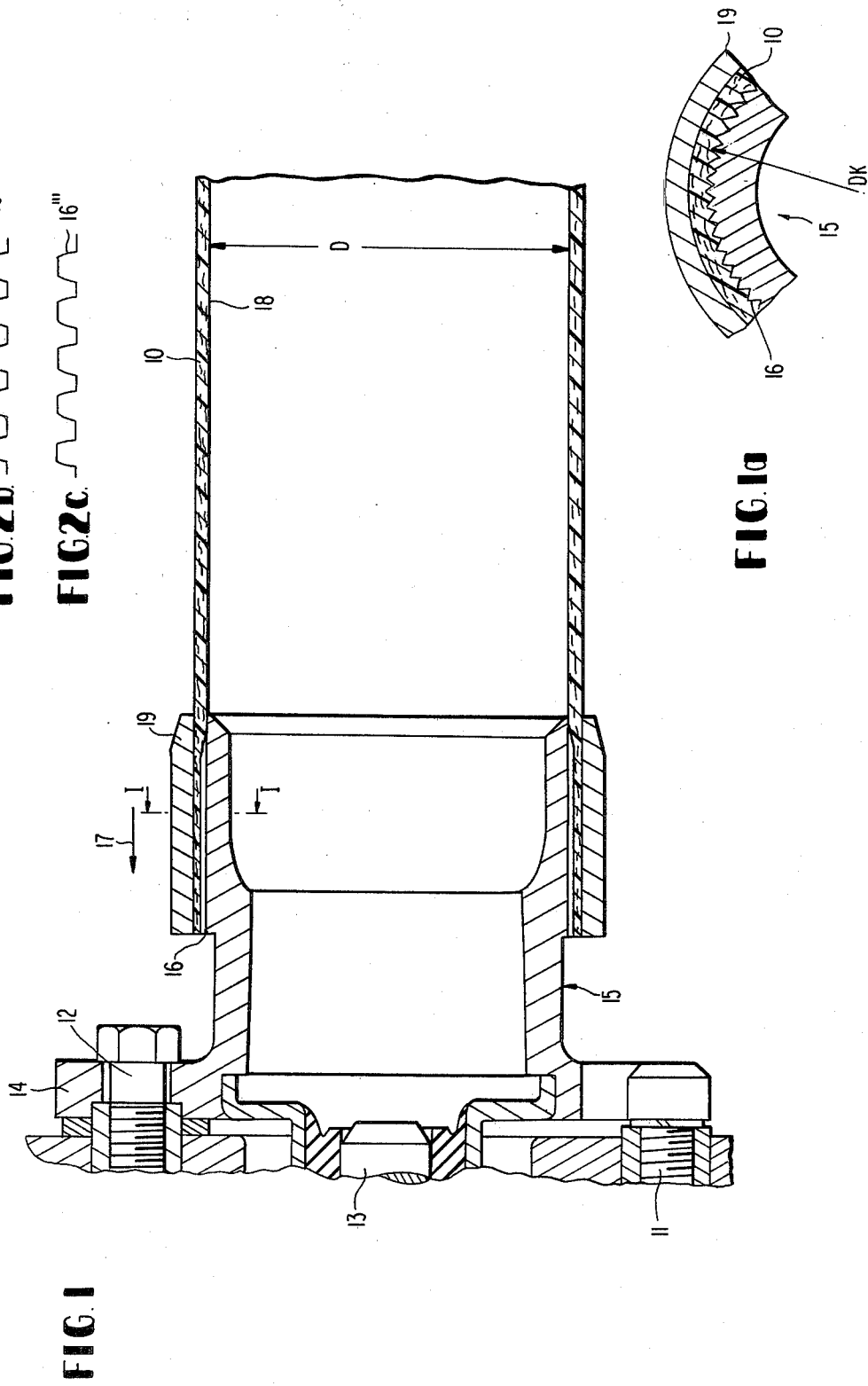

COUPLING CONNECTION FOR A FIBER REINFORCED SYNTHETIC RESIN PIPE

The present invention relates to a coupling and, more particularly, to a coupling connection for fiber reinforced synthetic resin pipes, especially pipes forming driving or driven hollow shafts of motor vehicles, wherein the fiber reinforced synthetic resin pipe is joined with a coupling element arranged concentrically to the pipe so that the pipe rotates with the coupling element.

Concentrated efforts have been undertaken in motor vehicle construction to reduce the vehicle weight and a practice has been increasingly adapted of replacing conventional materials such as steel with, for example, materials having a lower specific gravity, especially synthetic resins. However, difficulties are encountered with synthetic resin parts in components which are adapted to transmit great forces and/or torques. For example, such difficulties would be encountered not only in a universal shaft but also in axle shafts leading to wheels of the motor vehicle.

In U.S. Pat. No. 4,089,190, it has been proposed to manufacture drive shafts of a carbon fiber fibrous synthetic resin material with a specific arrangement of the fibers with respect to a direction of the force transmission. A fiber reinforced synthetic resin pipe such as proposed in this patent is indeed definitely suitable for the transmission of high torques especially with respect to the overall strength characteristics of the pipe; however, one difficulty resides in establishing a non-rotational coupling connection, highly stressible, of the fiber reinforces synthetic resin pipe with the drive shaft or, if the fiber reinforced resin pipe itself is the drive shaft, with a driven shaft.

A coupling connection has been proposed wherein a synthetic resin pipe reinforced with carbon filters, is provided at both of its ends with coupling elements, with the coupling elements each consisting of two coaxial sleeves between which the respective end of the fiber synthetic resin pipe is fastened by an adhesive. An inner one of the two coaxial sleeves is hexagonal in shape and, in a zone between the sleeves, the fiber reinforced synthetic resin pipe is provided with perforations which are filled with the adhesive. Thus, this proposed coupling means is essentially a force-derived connection. While a certain shape-mating character of the connection is achieved, such character is merely based upon the limited strength of the poured in adhesive after it has hardened.

In the above-noted coupling connection, an introduction of torque into the fiber reinforced synthetic resin pipe is effected in several ways. Essentially, the adhesive bond between the outer surface of the fiber reinforced synthetic resin pipe and an inner wall of the outer sleeve is provided for this purpose, i.e., a force-derived rotational connection. In case this force-derived rotational connection should fail, the above-noted shape-mating connection is provided by way of adhesive filled perforations as well as the hexagonal configuration of the inner sleeve.

Disadvantages of the above-noted proposed coupling connection reside in the fact that relatively many components are necessary to effect the coupling connection with the components being adapted to one another. Moreover, centering problems are encountered in the exact coaxial correlation of these parts with respect to one another. Moreover, it is at least questionable whether the proposed coupling connection is at all capable of transmitting the high torques which occur in motor vehicles. Additionally, the proposed coupling connection also requires a relatively large amount of space due, on the one hand, to the large number of parts utilized and, on the other hand, due to the necessity of a gap of considerable width which must be provided so as to be filled in by an adhesive layer so that the hardened layer of adhesive is subsequently capable of absorbing temperature changes during manufacture and operation of the respective shaft and/or changes in length of the coupling parts occurring with such temperature changes. A more significant disadvantage of the proposed coupling connection resides in the fact that the adhesive bond in no way exhibits the long term stability required for utilization in motor vehicle construction.

The aim underlying the present invention essentially resides in providing a coupling connection of the aforementioned type which is capable of transmitting high torques even during long term operation without exhibiting a wear and tear phenomena.

In accordance with advantageous features of the present invention, the coupling element exhibits peripheral teeth and is pressed into the fiber reinforced synthetic resin pipe in such a manner that the coupling element forms a shape-mating connection with the fiber reinforced synthetic resin pipe in a direction of rotation.

By virtue of the above noted features of the present invention, it is suprisingly possible to establish a shape-mating hollow shaft connection suitable for transmission of extremely high torques, wherein it is merely necessary to machine a serration into the coupling element. The corresponding counter serration in the fiber reinforced synthetic resin pipe is automatically produced by the cutting effect of the serration in the coupling element.

Advantageously, the coupling element of the present invention may be fashioned of a metal such as, for example, steel; whereas, the hollow shaft or quill shaft to be non-rotatably coupled therewith may be manufactured from a carbon-fiber reinforced synthetic resin.

While it has already been proposed to establish shape-mating rotational connections by interlocking teeth of parts to be coupled with each other, in contrast to the conventional shaft or hollow shaft teeth, in accordance with the present invention, the fact must be taken into account that the corresponding serration in the fiber reinforced synthetic resin pipe is not provided beforehand such as, for example, by a cutting machine operation but rather is produced only upon assembly with the coupling element. In actuality, one would have to expect, that due to the cutting effect of the serration of the coupling element which produces a notching effect, a considerable weakening in the strength of the fiber reinforced synthetic resin pipe would occur and that such weakening would be found precisely in the coupling zone; however, it has been discovered that under practical conditions, the capability of the fiber reinforced synthetic resin pipe of absorbing and/or transmitting high torsional or torque moments is in no way impaired by the notching effect and, in fact, in conducted tests, the coupling connection of the present invention has been found to be of excellent suitability for motor vehicles.

In a practical realization of the present invention, it was found to be expedient to support the radial forces, exerted by the serration of the coupling element on a fiber reinforced synthetic resin pipe in opposite directions. Therefore, in a further development of the present invention, it is proposed to arrange the fiber reinforced synthetic resin pipe concentrically between the coupling element exhibiting the peripheral teeth and a supporting element.

In a further practical realization of the present invention, it is further proposed to provide the coupling element with external teeth and to place the fiber reinforced synthetic resin pipe with its associated end onto the external teeth of the coupling element in such a manner that the external teeth cut and/or engage into an inner wall of the fiber reinforced synthetic resin pipe. However, it is also possible conversely, to provide a tubular configured coupling element with internal teeth and to push the same onto an associated end of the fiber reinforces synthetic resin pipe in such a manner that internal teeth and/or engage into an outer wall of the fiber reinforced synthetic resin pipe.

Moreover, the coupling element and the supporting element, of a single or multiple part construction, may each be provided with teeth on mutually facing sides so that, when synthetic resin pipes are inserted therebetween and a non-rotational connection is established between the coupling element and the supporting element, it is possible for torques to be transmitted directly from the coupling element as well as from the supporting element to the interposed fiber reinforced synthetic resin pipe.

The supporting member or supporting element may, for example, be a sleeve-like part encompassing an end of the fiber reinforced synthetic resin pipe in a fitting fashion especially under pre-tensioning.

The coupling member may be provided in the serration zone with at least one continuous groove cut at least down to a tooth base, with the groove being filled with a resin or a technically equivalent synthetic resin material.

In accordance with further features of the present invention, the coupling member may consist of a tubular inner part and a sleeve-like outer part concentrically surrounding the inner part and non-rotatably connected thereto, with the outer part being provided with external teeth.

Advantageously, the tubular inner part, the sleeve-like outer part, and the fiber reinforced synthetic resin pipe, and the outer supporting member may additionally be connected, in accordance with the present invention, in a shape mating fashion by one or several radially oriented metal sleeves which have a form of hollow rivets and are pressed into place.

The coupling connection of the present invention may be used for axle shafts of motor vehicles with torque transmission by means of a homo-kinetic joint, with the coupling elements simultaneously forming a radially inner driving part of the homo-kinetic joint.

It is also possible in accordance with the present invention for a sleeve-like supporting member to be provided with outer teeth engaging into an inner wall of the fiber reinforcing synthetic pipe with the supporting member being joined with the coupling element into an integral component by means of a flange radially extending over an end of the fiber reinforced synthetic resin pipe.

The coupling element of the present invention may be provided with wedge-shaped teeth having a tooth depth which uniformly increases in an axial assembly direction of the fiber reinforced synthetic resin pipe to a maximum depth.

Advantageously, an axial stop may be provided at the end of the wedge-shaped serration having the maximum tooth depth for defining an imposition of the fiber reinforced resin pipe during axial displacement thereof.

The wedge-shaped serration, in accordance with the present invention, may be provided on the outer periphery of the coupling element and exhibit a crown circle diameter which uniformly increases in the assembly direction of the fiber reinforced synthetic resin pipe.

Advantageously, the fiber reinforced synthetic pipe has an inner diameter which uniformly increases toward the outside and its end in engagement with the coupling member.

Wedge-shaped teeth may be provided on the inner periphery of the coupling member and exhibit an inner or crown circle diameter which uniformly decreases in an assembly direction of the fiber reinforced synthetic resin pipe.

It is also possible in accordance with the present invention for the fiber reinforced synthetic resin pipe to have at its end in engagement with the coupling member an outer diameter which uniformly decreases in the assembly direction of the fiber reinforced synthetic resin pipe.

The coupling element of the present invention is non-rotatably connected with the supporting element in a shape-mating fashion with the coupling element and supporting element each being provided with peripheral teeth along their mutually facing sides.

The teeth of the coupling element may be triangular in cross section or be of a trapazoidal configuration. It is also possible for the teeth on the coupling element to have either linear or rounded flanks.

Accordingly, it is an object of the present invention to provide a coupling connection for fiber reinforced synthetic resin pipes which avoids, by simple means shortcomings and disadvantages encountered in the prior art.

Another object of the present invention resides in providing a coupling connection for fiber reinforced synthetic resin pipes which is simple in construction and therefore inexpensive to manufacture.

Another object of the present invention resides in providing a coupling connection for fiber reinforced synthetic resin pipes which requires a small number of parts to form the coupling connection.

Yet another object of the present invention resides in providing a coupling connection for fiber reinforced synthetic resin pipes which permits a compact overall construction.

A further object of the present invention resides in providing a coupling connection for fiber reinforced synthetic resin pipes which is capable of transmitting high torques and which provides for a long term stability.

These and other objects, features, and advantages will become more apparent from the following description when taken in connection with the accompanying drawings which show, for the purposes of illustration only, several embodiments in accordance with the present invention, and wherein:

FIG. 1 is a longitudinal cross sectional view of a coupling connection constructed in accordance with the present invention with an externally serrated coupling element engaging into a hollow shaft;

FIG. 1a is a partial cross sectional view taken along the line I—I in FIG. 1;

FIGS. 2a, 2b and 2c illustrate three possible forms of teeth for an external serration of the coupling element;

Figure 3:
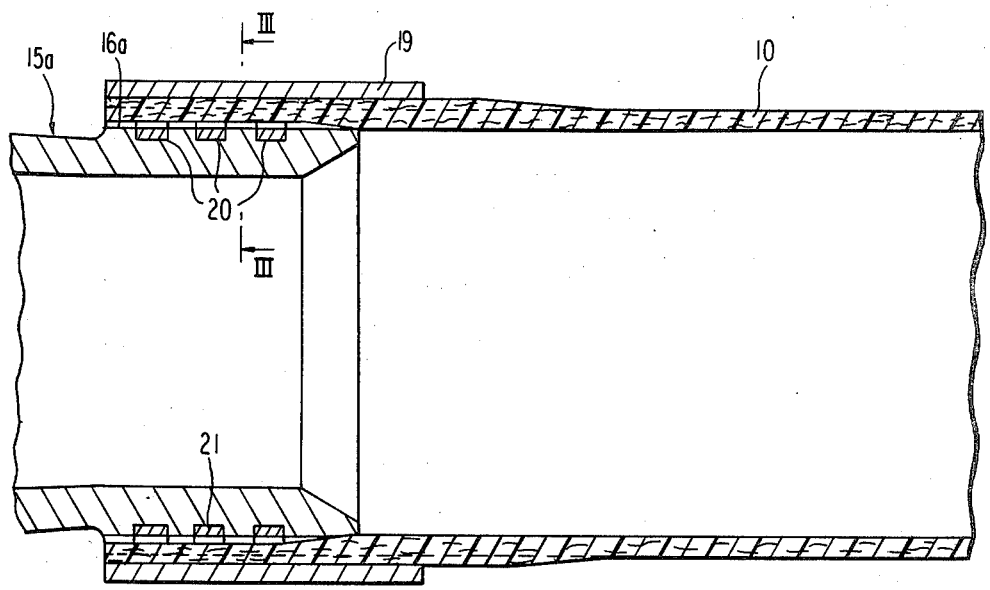
FIG. 3 is a longitudinal cross sectional view of a second embodiment of a coupling connection in accordance with the present invention, with an externally serrated coupling element engaging into a hollow shaft.

Referring now to the drawings wherein like reference numerals are used throughout the various views to designate like parts and, more particularly, FIG. 1, according to this figure, a hollow shaft 10 of a fiber reinforced synthetic resin such as, for example, a carbon-fiber reinforced synthetic resin may, for example, be a universal shaft of a motor vehicle coupled by way of fastening elements 11, 12 to a transmission output shaft 13 by way of a conventional flanged connection generally employed for coupling the universal shaft to the transmission output shaft 13.

The flange connection includes a flange 14 provided for non-rotatably coupling the shaft 10 with the transmission output shaft 13. The flange 14 is not a direct part of the fiber reinforced synthetic resin shaft proper but rather forms a part of a tubular configured synthetic coupling element generally designated by the reference numeral 15 which, as shown in FIGS. 1 and 1a is provided with a peripheral serration 16 the teeth of which extend axially of the coupling element 15. The peripheral serration 16 has a circular crown diameter $D_K$ which is larger than an internal diameter D of the fiber reinforced synthetic resin shaft 10.

The coupling element 15 and fiber reinforced synthetic resin shaft 10 are placed into the assembled position shown in FIG. 1 by pushing part 10 in a direction of the arrow 17 onto the coupling element 15. Due to a compressive force to be exerted on the shaft 10 and coupling element 15 and due to the differences in the diameter $D_K$ and D, the serration of the metallic coupling element 15 automatically cuts into an inner wall of the fiber reinforced synthetic resin pipe 10 thereby establishing a shape mating non-rotational connection between the shaft 10 and coupling element 15. In order to support the shape-mating toothed coupling between the shaft 10 and coupling element 15, a band-like supporting element 19 is provided which may be formed of a metal or corresponding material and which may be applied by, for example, shrink fitting, winding, or pressing onto the fiber reinforced synthetic resin shaft 10.

As shown in FIGS. 2a, 2b and 2c, the serration of the coupling element may take the form of teeth 16' having a triangular cross section, teeth 16" having a trapezoidal configuration or teeth 16''' having rounded flanks.

The embodiment of FIG. 3 essentially corresponds to the embodiment of FIGS. 1 and 1a with the difference merely residing in the fact that a coupling element generally designated by the reference numeral 15a is provided on an outer peripheral surface with several continuous grooves 20 arranged at a mutual axial spacing. In the assembled position of FIG. 3, the grooves are filled with a resin or similar plastic material 21 so that, on the one hand, an axial fixation of the shaft 10 and coupling element 15a is achieved and, moreover, an improved introduction of the torque from the shaft 10 to the coupling element 15a, or conversely, is also achieved.

Figure 3A:
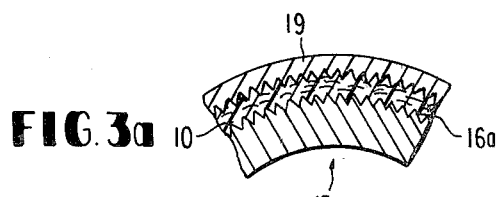
FIG. 3a is a partial cross sectional view taken along the line III—III in FIG. 3.

As shown in FIGS. 3 and 3a, the coupling element 15a is provided with a peripheral serration 16a teeth of which extend axially of the coupling element 15a. As with the embodiment of FIGS. 1 and 1a, the teeth of the peripheral serrations 16a have a circular crown diameter which is larger than an internal diameter of the fiber reinforced synthetic resin shaft 10.

Figure 4:
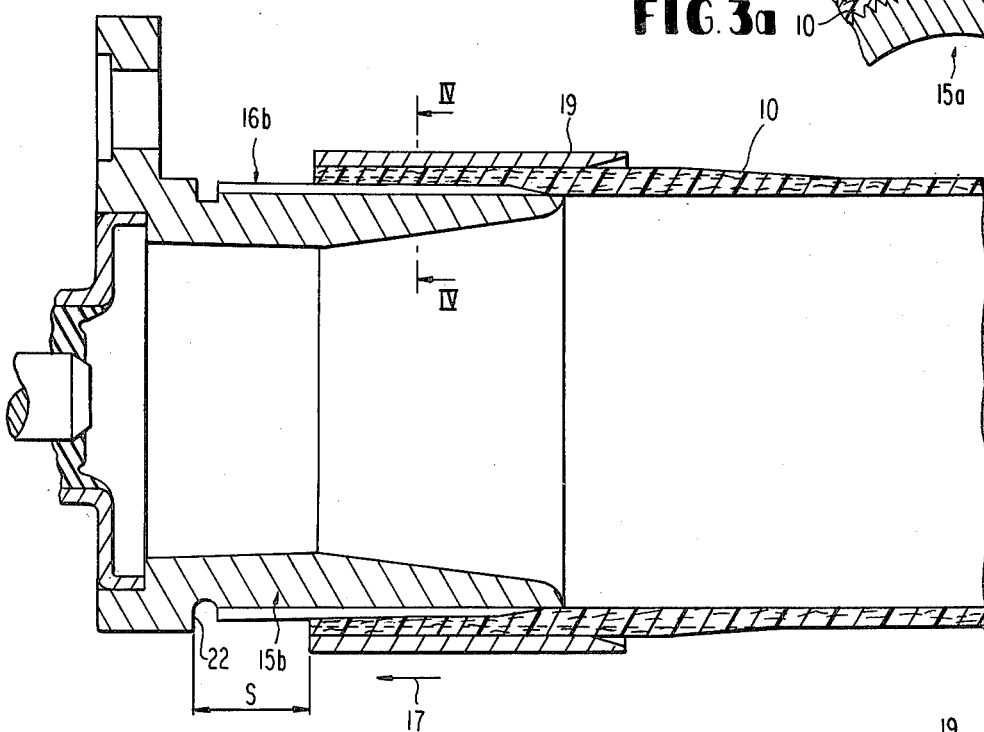
FIG. 4 is a longitudinal cross sectional view of a third embodiment of a coupling connection in accordance with the present invention with an externally serrated coupling element engaging into a hollow shaft.
Figure 4A:
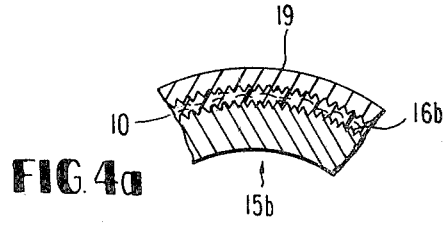
FIG. 4a is a partial cross sectional view taken along the line IV-IV in FIG. 4.

The embodiment of FIGS. 4 and 4a likewise correspond essentially to the embodiment of FIGS. 1 and 1a with a significant feature of the embodiment of FIGS. 4 and 4a residing in the fact that a coupling element generally designated by the reference numeral 15b is provided with a peripheral serration 16b which has a tooth depth which uniformly increases in the axial assembly direction of the fiber reinforced synthetic resin shaft 10 up to a maximum depth.

By virtue of the above-noted features of the embodiment of FIGS. 4 and 4a an assembly of the shaft 10 and coupling element 15b is facilitated because, in the beginning, the pressure forces to be applied in the direction of the arrow 17 are comparatively small due to the initially minor tooth depth of the serration 16b and increases only gradually up to a final assembled position which is approximately illustrated in FIG. 4.

As shown in FIG. 4, the fiber reinforced synthetic resin shaft 10 could actually still be pushed further onto the serration 16b by an additional distance S until it would abut with its end face against an axial stop 22. The residual displacement distance S is provided in case of possible accident due to, for example, a frontal collision of the vehicle with an obstacle during which the shaft 10 and coupling element 15b could then telescope into each other. Such a possibility would be present when, for example, utilizing the fiber reinforced synthetic resin shaft 10 as a universal shaft for a motor vehicle.

While, as noted above, the shaft 10 and coupling element 15b execute an axial movement relative to each other, the wedged shaped serration 16b will increasingly cut more deeply into the fiber reinforced synthetic resin shaft 10 whereby, with the shaft 10 being utilized as a universal shaft for a motor vehicle, a portion of kinetic energy occurring during a collision of the motor vehicle is converted into deformation energy and is thus absorbed.

In addition to the provision of a wedge shaped serration, it is also possible to fashion a cylindrical inner space of the fiber reinforced synthetic resin shaft 10 to conically diverge toward the outside at the end thereof which would likewise contribute toward facilitating the assembly of the shaft 10 and the coupling element 15b.

The embodiment of FIGS. 5 and 5a essentially differ from the embodiments described hereinabove in that a coupling element generally designated by the reference numeral 15c is provided which is composed of a tubular inner part 23 and a sleeve-like outer part 24 which are arranged concentrically with respect to each other, with the sleeve-like outer part 24 encompassing the inner part 23 and being non-rotatably connected to the inner part 23. The outer part 24 of the coupling element 15c is provided with an external serration 16c meshing with the fiber reinforced synthetic resin shaft 10.

A pressed in place metal sleeve 25 having the form of a hollow rivet is provided for connecting the inner and outer parts 23, 24 in an axial as well as in a rotational direction. However, as shown in FIG. 5, the metal sleeve 25 does not only penetrate the inner and outer parts 23, 24 of the coupling element 15c but also the fiber reinforced synthetic resin shaft 10 and also the supporting element 19 surrounding the shaft 10. The metal sleeve 25 is pressed into radial bores of the supporting element 19, shaft 10, outer part 24, and inner part 23, which bores are arranged in corresponding mutual alignment. The penetration of the metal sleeve 25 ensures not only an axial fixation of the parts with respect to one another but also exerts a certain additional serration meshing effect in the direction of rotation of the shaft 10.

Figure 5:
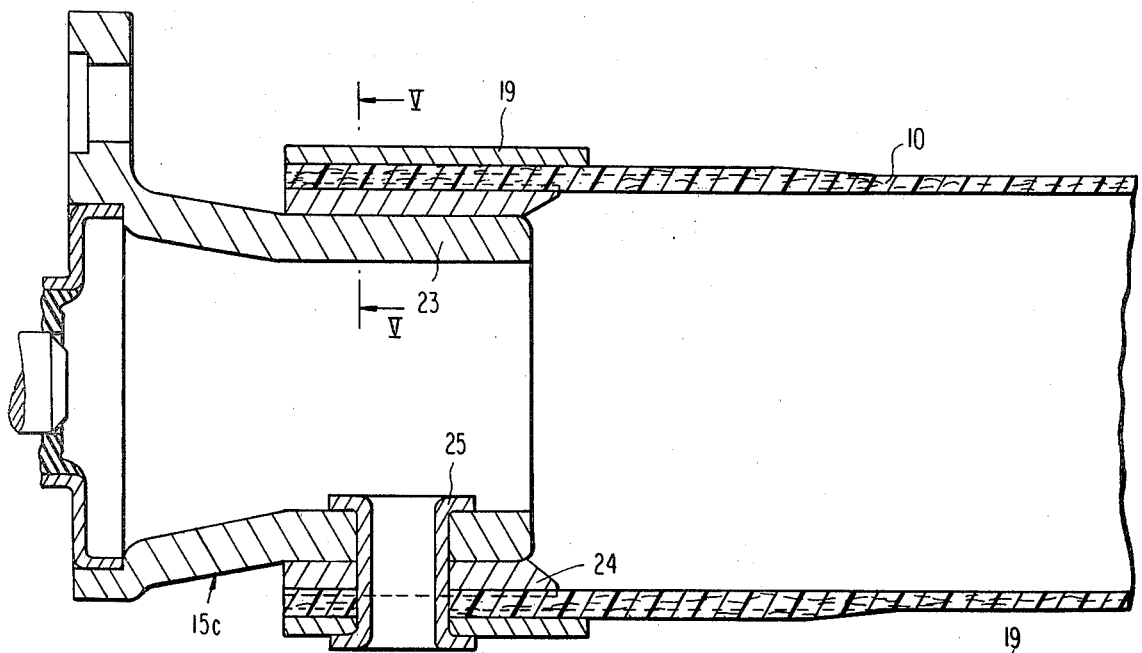
FIG. 5 is a longitudinal cross sectional view of a fourth embodiment of a coupling connection in accordance with the present invention, with an externally serrated coupling element engaging into a hollow shaft.
Figure 5A:
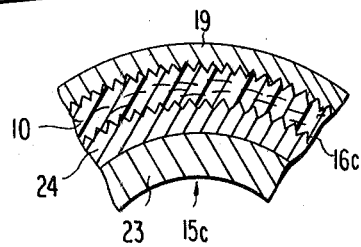
FIG. 5a is a partial cross sectional view taken along the line V—V in FIG. 5.

It is also advantageous to provide not only a single metal sleeve 25 such as illustrated in FIG. 5 but also to provide several such metal sleeves uniformly spaced in a peripheral direction of the coupling element 15c. It would also be possible to provide an arrangement wherein only the supporting part 19, shaft 10, and outer part 24 are penetrated by a hollow-rivet-type metal sleeve, with a non-rotatable connection being established between the inner part 23 and the outer part 24 by means of a serration (not shown).

With a continuous metal sleeve such as illustrated in FIG. 5, a substantial advantage is obtained in that a sufficient radial depth is available for the inner cylindrical surfaces of the bores.

Figure 6:
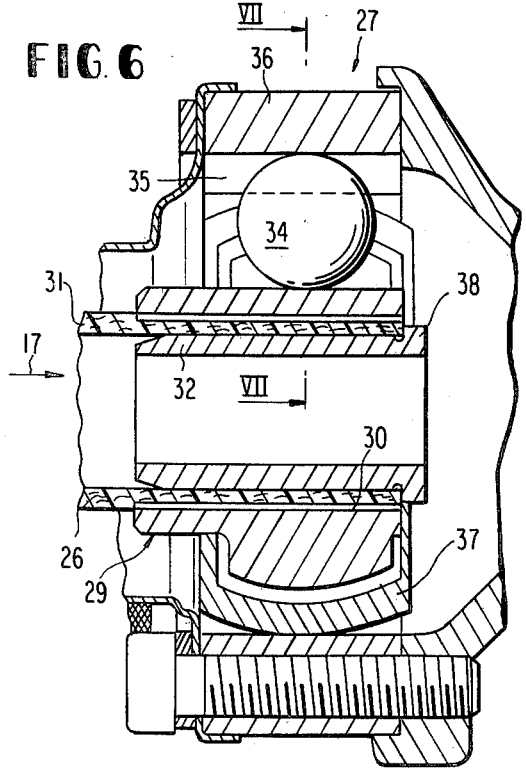
FIG. 6 is a longitudinal cross sectional view of fifth embodiment of a coupling connection in accordance with the present invention, with an internally serrated coupling element encompassing a hollow shaft.
Figure 7:
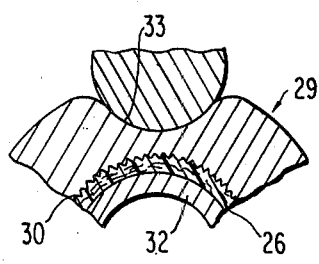
FIG. 7 is a cross sectional segment-shaped fragmentary view taken along the line VII—VII in FIG. 6.

FIGS. 6 and 7 provide an example of a fiber reinforced synthetic resin pipe or shaft 26 which may, for example, be utilized as an axle side shaft for a motor vehicle with these figures illustrating a lateral end of such axle side shaft where the drive forces are transmitted by way of a homokinetic joint to an associated vehicle wheel (not shown). As shown in FIGS. 6 and 7, a coupling element generally designated by the reference numeral 29 is provided, with the coupling element 29 differing from the previously described coupling elements in that is does not engage from an interior of the fiber reinforced resin shaft 26 but rather overlaps the same along an outer periphery of the shaft 26.

As shown most clearly in FIG. 7, the coupling element 29 includes internal teeth 30 by means of which the coupling element 29 cuts into an outer wall 31 of the fiber reinforced synthetic resin shaft 26. A sleeve-like supporting member 32 pushed, for example, by pressing or shrink fitting, into the end of the shaft 26 is provided for a radial support of the tooth forces of the coupling element 29 which, in this embodiment, are oriented from the outside toward the inside of the shaft 26.

A further special feature of the embodiment of FIGS. 6 and 7 resides in the fact that the coupling element 29 simultaneously constitutes a radially inner driving part of the homokinetic joint. More particularly, as shown in FIG. 7, the driving part or coupling element 29 of the homokinetic joint includes along its periphery several and, in most cases, three, spherical indentations 33 which respectively accommodate a ball 34. An upper portion of the balls 34 engage, as shown most clearly in FIG. 7, into a groove-like recess of an annular outer member 36 of the homokinetic joint. A cage 37 is provided for holding the balls 34 in the center. A driving torque of the axle side shaft, i.e., the carbon reinforced synthetic resin pipe 26 is thus transmitted from the inner bearing part, i.e., the coupling element 29, through the balls 34 to the outer part 36 from where the torque is introduced into the vehicle wheel.

As also illustrated in FIG. 6, there is a possibility for modifying the illustrated construction in such a way that the sleeve-like supporting member 32 exhibits a flange 38 extending radially over an end of the fiber reinforced synthetic resin shaft 26, which flange may then be firmly joined to the coupling element 29. It would also be possible in accordance with the present invention to produce the coupling element 29 and the sleeve-like supporting member 32 as a single component. An even firmer meshing of the fiber reinforced synthetic resin shaft 26 with the coupling element 29 and the sleeve like supporting member 32 could be accomplished if the supporting member 32 is likewise provided with teeth along its outer circumference, which teeth could then cut inside into the fiber reinforced synthetic resin shaft 26.

It is also possible in accordance with the present invention to include in the construction of FIGS. 6 and 7 the features suggested hereinabove in connection with FIG. 4; namely, the providing of a wedge-like axially increasing serration between the shaft 26 and coupling element 29. However, in such a situation, in a kinematic reversal, the crown circle diameter of the serration, i.e., internal teeth 30 of the coupling element 29 must decrease uniformly in the assembly direction. Additionally or alternatively to this measure, the outer diameter of the fiber reinforced synthetic resin shaft 26 may furthermore be made to taper uniformly in a direction toward the end so as to facilitate the assembly step mentioned hereinabove in connection with FIG. 4 and corresponding arrangements.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A coupling connection for fiber reinforced synthetic resin shaft, comprising a shaft having a connecting area at a distal end of the shaft, support means and coupling means for cutting the internal diameter of the fiber reinforced synthetic resin shaft, the coupling means being disposed concentrically to the shaft, the coupling means having a plurality of peripherally disposed teeth members on a circumference of the coupling means, the teeth members extending axially of the coupling means and having a circular crown diameter larger than the internal diameter of the fiber reinforced synthetic resin shaft so that the interior circumference of the connecting area of the fiber reinforced synthetic resin shaft assumes the form of a cutting circumference of the coupling means and form-lockingly engages the coupling means upon axial emplacement and simultaneous cutting of the cutting teeth members of the coupling means into the connecting area of the shaft, wherein the fiber reinforced synthetic resin shaft is cut by the teeth members into the shaft along its circumference conforming the internal circumference of the shaft to the shape of the teeth members, thereby non-rotatably joining the shaft to the coupling means so that the shaft rotates with the coupling means.

2. The connection according to claim 1, wherein the coupling means is inserted into the fiber reinforced synthetic resin shaft.

3. A coupling arrangement according to one of claims 1 or 2, characterized in that the plurality of teeth members have a triangular cross sectional configuration.

4. A coupling arrangement according to claim 1, characterized in that the teeth members have a trapezoidal cross sectional configuration.

5. A coupling arrangement according to claim 1, characterized in that the teeth members have rounded flanks.

6. The connection according to claim 1, wherein the support means is pressed or shrunk fitted onto the fiber reinforced synthetic resin shaft.

7. The connection according to claim 1, wherein the support means is slipped externally over the fiber reinforced synthetic resin shaft.

8. A coupling arrangement according to claim 7, characterized in that the plurality of teeth members have a triangular cross sectional configuration.

9. A coupling arrangement according to claim 7, characterized in that the teeth members have a trapezoidal cross sectional configuration.

10. A coupling arrangement according to claim 7, characterized in that the teeth members have linear flanks.

11. A coupling arrangement according to claim 7, characterized in that the teeth members have rounded flanks.

12. A coupling arrangement according to claim 1, characterized in that the coupling means is provided with at least one continuous groove in an area of the teeth members, and in that the at least one groove is filled with a resin material.

13. A coupling arrangement according to claim 12, characterized in that the support means is formed as a sleeve member adapted to encompass the end of the pipe member.

14. A coupling arrangement according to claim 13, characterized in that the sleeve member encompasses the end of the pipe member in a fitting fashion under a pretensioning.

15. A coupling arrangement according to claim 14, characterized in that the plurality of teeth members have a triangular cross sectional configuration.

16. A coupling arrangement according to claim 14, characterized in that the teeth members have a trapezoidal cross sectional configuration.

17. A coupling arrangement according to claim 14, characterized in that the teeth members have linear flanks.

18. A coupling arrangement according to claim 14, characterized in that the teeth members have rounded flanks.

19. A coupling arrangement according to claim 1, characterized in that the plurality of teeth members have a wedge-shaped configuration and a tooth depth which uniformly increases in an axial direction of the coupling means as viewed in an assembly direction of the pipe member and coupling means.

20. A coupling arrangement according to claim 19, characterized in that an axial stop means is disposed adjacent an end of the wedge-shaped teeth having a maximum tooth for defining an end position of the pipe means during an axial displacement thereof.

21. A coupling arrangement according to claim 20, characterized in that the teeth are provided on an outer periphery of the coupling means, the plurality of teeth have a crown circle diameter which uniformly increases in an assembly direction of the pipe member and the coupling means.

* * * * *